United States Patent
Gitelman et al.

(10) Patent No.: US 10,515,089 B2
(45) Date of Patent: Dec. 24, 2019

(54) PSEUDO-SYNCHRONOUS PROCESSING BY AN ANALYTIC QUERY AND BUILD CLUSTER

(71) Applicant: salesforce.com, inc., San Francisco, CA (US)

(72) Inventors: Alex Gitelman, Berkeley, CA (US); Ruisheng Shi, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 235 days.

(21) Appl. No.: 15/589,728

(22) Filed: May 8, 2017

(65) Prior Publication Data
US 2018/0322178 A1    Nov. 8, 2018

(51) Int. Cl.
*G06F 16/25* (2019.01)
*G06F 16/23* (2019.01)
*G06F 16/2453* (2019.01)

(52) U.S. Cl.
CPC ........ *G06F 16/254* (2019.01); *G06F 16/2379* (2019.01); *G06F 16/24542* (2019.01)

(58) Field of Classification Search
CPC ............... G06F 16/254; G06F 16/2379; G06F 16/24542
USPC ........................................................ 707/602
See application file for complete search history.

(56) References Cited

U.S. PATENT DOCUMENTS

2013/0275364 A1* 10/2013 Wang .................... G06F 16/283
                                                      707/602
2015/0363465 A1* 12/2015 Bordawekar ..... G06F 16/24542
                                                      707/718

* cited by examiner

*Primary Examiner* — Evan Aspinwall
(74) *Attorney, Agent, or Firm* — Holland & Hart LLP (57) ABSTRACT

The technology disclosed relates to creating and frequently updating multiple online analytic processing (OLAF) analytic databases from an online transaction processing (OLTP) transaction updatable system that includes transaction commit, rollback, and field level security capabilities. It also relates to transparently decoupling extraction from rebuilding of frequently updated OLAP analytic databases from the OLTP transaction updatable system.

22 Claims, 8 Drawing Sheets

PSEUDO-SYNCHRONOUS PROCESSING BY AN ANALYTIC QUERY AND BUILD CLUSTER

CROSS REFERENCE TO OTHER APPLICATION

This application incorporates by reference U.S. Nonprovisional patent application Ser. No. 15/358,128, entitled "STREAMLINED CREATION AND UPDATING OF OLAP ANALYTIC DATABASES", filed on Nov. 21, 2016.

FIELD OF THE TECHNOLOGY DISCLOSED

The technology disclosed relates generally to data processing apparatus and corresponding methods for the retrieval of data stored in a database or as computer files, and in particular relates to implementing pseudo-synchronous processing of units of work (UsOW) by an analytic query and build cluster (AQBC), also referred herein as "analytics cluster".

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

A vast amount of data, more than ever before, is available to organizations from multitude of sources. This presents an unprecedented opportunity to organizations to learn more about their businesses, markets and customers. The databases to answer these analytic queries are built from transaction processing systems. The computing hardware to build and query these analytic databases is very efficient in handling a variety of end user analytical queries and build requests. However, the end users have no control on such computing hardware after database build tasks and queries are dispatched for processing. The computing hardware processes end. user analytic queries and database build requests based on available resources without giving any consideration to ordering amongst these requests.

An opportunity arises to enable users to efficiently process their analytic queries and database build requests in an ordered manner without impacting the operation and performance of the computing hardware. Improved user experience, higher response times, reduced errors, and greater computational efficiency may result.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DETAILED DESCRIPTION

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

Introduction

The technology disclosed provides external unit of work (UOW) sequencing that dispatches build units of work (UsOW) to an online analytic processing (OLAP) analytic query and build cluster (AQBC), also referred to herein as "analytics cluster". The OLAP system architecture efficiently executes a mix of analytic queries and UsOW build requests, but does not accept, interpret or implement dependencies among or sequencing of UsOW. This type of OLAP analytic and build cluster mixes UsOW types by executing UsOW in allocation slots, without constraining the order of starting or completing UsOW. Rather than constraining the order of execution, the system limits the number of build UsOW executing simultaneously, to give the analytic UsOW a rough measure of priority and satisfy users' expectations for analytic performance. Analytic users are more demanding than build requesters. Build requesters expect to wait for their OLAP read only databases used to execute queries.

The sequencing technology can sequence online transaction processing (OLTP) UsOW that extract objects from a transaction processing system, in preparation for integration into an OLAP read only database. It also can sequence acquisition of data from external systems, controlled by a customer instead of a purveyor of the OLAP and OLTP systems. The UsOW do not have to be performed by the same hardware or against the same data sets in order for external sequencing to apply.

Building OLAP read only databases often proceeds in stages, adding data or aggregating data across units, producing different databases accessible to users with differing roles. Both builds from extracted objects and augmenting data for the CXO suite require sequencing that the OLAP system architecture does not provide.

System Overview

Figure 1:
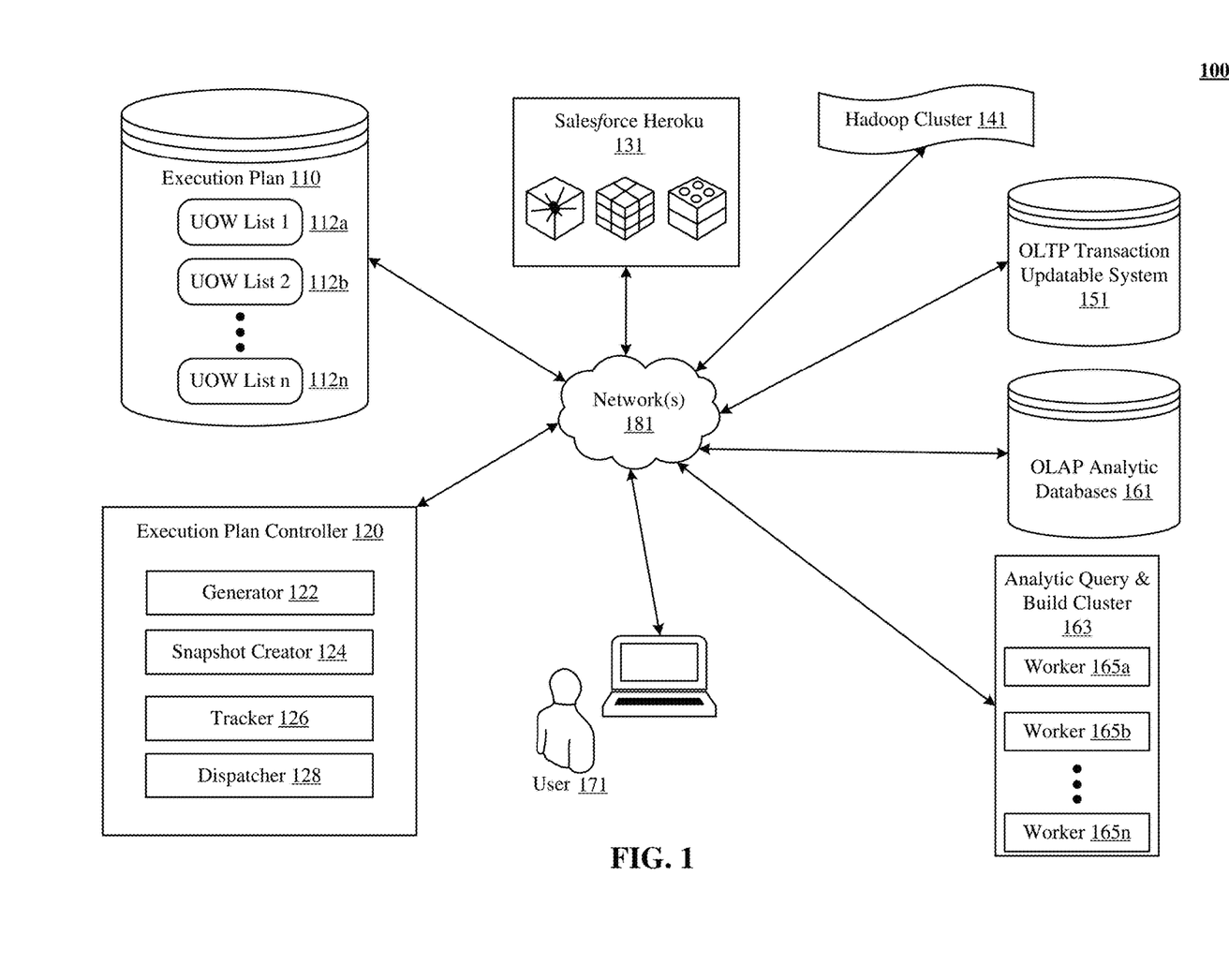
FIG. 1 shows aspects of a system that implements pseudo-synchronous processing of units of work (UsOW) by an analytic query and build cluster (AQBC).

We describe a system and various implementations of pseudo-synchronous processing of units of work (UsOW) by an analytic query and build cluster (AQBC), also referred to herein as "analytics cluster". FIG. 1 shows an architectural level schematic of a system in accordance with an implementation. Because FIG. 1 is an architectural diagram, certain details are intentionally omitted to improve the clarity of the description.

The discussion of FIG. 1 will be organized as follows. First, the elements of the figure will be described, followed by their interconnections. Then, the use of the elements in the system will be described in greater detail.

FIG. 1 includes the system 100. The system 100 includes an execution plan 110, an execution plan controller 120, a Salesforce Heroku™ instance 131, a Hadoop™ cluster 141, an OLTP transaction updatable system 151, OLAP analytic databases 161, an AQBC 163, a user 171 and a network(s) 181. The execution plan 110 contains unit of work (UOW) lists 112a-n. Each UOW list contains one or more UsOW. The execution plan controller 120 contains a generator 122, a snapshot creator 124, a tracker 126, and a dispatcher 128.

The network(s) 181, couples the execution plan 110, the execution plan controller 120, the Salesforce Heroku™ instance 131, the Hadoop™ cluster 141, the OLTP transaction updatable system 151, the OLAP analytic databases 161, the AQBC 163 and the user 171, all in communication with each other (indicated by solid double-arrowed lines). The actual communication path can be point-to-point over public and/or private networks. The engines or system components of FIG. 1 are implemented by software running on varying types of computing devices. Example devices are a workstation, a server, a computing cluster, a blade server, and a server farm.

System 100 includes the OLTP transaction updatable system 151, which has transaction commit, rollback, and field level security capabilities. In one implementation, the OLTP transaction updatable system 151 is a multi-tenant database system in which various elements of hardware and software of the database system can be shared by one or more users. For example, a given application server can concurrently process requests for a great number of users, and a given database table can store rows for a potentially much greater number of users. instead of or in addition to the OLTP transaction updatable system 151, UsOW can also be composed of data received from external data sources. FIG. 1 shows examples of two such external data sources— Salesforce Heroku™ 131 and Hadoop cluster™ 141.

AQBC 163 implements an extract, load, and transform (ELT) process (also referred to herein as "data extraction") that results in the creation of OLAP datasets. AQBC 163 contains a logical grouping of hosts called workers (e.g., worker 165a, worker 165b, and worker 165n). Workers receive UsOW build requests, execute the instructions identified in the UsOW to create the OLAP datasets, and generate a message indicating success of the execution. After the ELT process, the resulting datasets are stored in OLAP analytic databases 161.

One example of a UOW build request is a so-called "sales wave app dataflow" that can include extracting database objects like accounts, contacts, opportunities, campaigns, leads, cases, and users from an OLTP database. Another example of a UOW build request is a so-called "service wave app dataflow" that can include extracting database objects like accounts, contacts, and users from the OLTP database. Yet another example a UOW build request is a so-called "replication dataflow" that can identify duplicate database objects across multiple dataflows like sales wave app dataflow and service wave app dataflow and proactively perform a global extraction of the duplicate database objects. Other examples of UsOW build requests can include connecting to external data sources, loading scripts, and executing source code.

In addition to UsOW build requests, AQBC 163 also receives analytic queries that apply to datasets in the OLAP analytic databases 161. For instance, a data analyst can issue an analytic query to build a dashboard which graphically depicts "how many leads were converted. into accounts in a given quarter".

Even though AQBC 163 efficiently executes a mix of analytic queries and UsOW build requests, it does not accept, interpret, or implement dependencies among or sequencing of UsOW. Instead, AQBC 163 mixes UsOW types by executing UsOW in allocation slots, without constraining the order of starting or completing UsOW. Thus, rather than constraining the order of execution, AQBC 163 limits the number of UsOW executing simultaneously.

Consider two UsOW: UOW A and UOW B, such that UOW A is a prerequisite of UOW B. In AQBC 163, when worker 165a becomes available, UOW A is dispatched to worker 165a for processing. Now consider that while the execution of UOW A is in progress, worker 165b becomes available. When this happens, UOW B is dispatched to worker 165b. However, this results in an execution failure because the prerequisite of UOW B, i.e., UOW A has not been completely processed by AQBC 163. One skilled in the art will appreciate that an execution failure can also occur when processing of UOW B initiates before dispatching of UOW A to an available worker, or when processing of both UsOW A and B is initiated at the same time by two different workers.

To prevent execution failure during processing of UsOW with prerequisites, the technology disclosed uses an execution plan controller 120 to provide external sequencing for dispatching UsOW build requests to AQBC 163. What results is a so-called "pseudo-synchronous" processing of UsOW by the AQBC 163. To implement this pseudo-synchronous processing, execution plan controller 120 generates an execution plan 110 which arranges UsOW in UOW lists or steps that preserve the prerequisites between the UsOW. The execution plan controller 120 can be executable code (e.g., Java™ class) with executable functions and state variables. Whenever execution plan 110 is created, a UOW requested, a UOW dispatched, or/and a UOW processed, execution plan controller 120 is called to check the current processing status of UsOW. Consider two UsOW: UOW X and UOW Y, such that UOW X is a prerequisite of UOW Y. In one implementation, to preserve the prerequisites between UOW X and UOW Y, the execution plan controller 120 stores UOW X in a first UOW list 112a and UOW Y in a second UOW list 112b such that the UOW list 112a is executed before the UOW list 112b.

The discussion now turns to the functionality of execution plan controller 120. Generator 122 creates the execution plan 110. In one implementation the generator 122 generates the execution plan 110 in dependence upon an input from the user 171. In such an implementation, the generator 122 is connected to a task group user interface 600 (discussed later with reference to FIG. 6). Using the task group user interface 600, the user 171, selects the UsOW and identifies the prerequisites for each UOW. In another implementation, this input is given to the generator 122 through an application programming interface (API). In another implementation, the input is received from an external file (e.g., a comma-separated values (CSV) file).

Before AQBC 163 begins processing of UsOW identified in the execution plan 110, snapshot creator 124 takes a snapshot of the execution plan 110. The snapshot is saved in a persistent data store (e.g., Cassandra™). After the snapshot is created, any changes made to the execution plan 110 with respect to UsOW selection or the ordering of UsOW are registered but not incorporated in the snapshot until processing of all the UsOW is complete. This allows user 171 to propose changes to the execution plan 110 without disrupting an ongoing execution of UsOW.

Tracker 126 is configured with the execution plan 120. When a worker in AQBC 163 has completely processed a UOW, the tracker 126 checks the execution plan 110 to determine whether all UsOW in the current UOW list are complete. If so, the tracker sends a message to the dispatcher 128 to dispatch UsOW in a next UOW list. In instances where all UsOW in a current UOW list are not complete, tracker 126 does not send a dispatch message.

To distinguish between completed UsOW, dispatched UsOW, and undispatched UsOW, tracker 126 uses a combination of a request ID for an undispatched UOW, an instance ID for a dispatched UOW, and a complete ID for a completed UOW. An undispatched UOW has a request ID associated with it. When the UOW is dispatched to AQBC 163, an instance ID is assigned to it. This can include assigning the instance ID to the dispatched UOW as it sits in a Redis™ queue waiting to be picked up by a worker of the AQBC 163. A UOW that is dispatched to AQBC 163 is also referred to herein as a "deployed UOW". After the UOW is processed and a response is received from AQBC 163, a complete ID is assigned to it. In other implementations, assigning the complete ID is optional and the UOW is marked as completely processed just based on receiving a response from AQBC 163.

Dispatching of UsOW can also depend on additional constraints. For example, a concurrency limit can be used to identify a maximum number of UsOW that can be sent to the AQBC 163. The concurrency limit can be set for an organization, a group of administrative users, or just an individual administrative user.

Since the communication between the dispatcher 128 and the AQBC 163 is asynchronous, they are agnostic to the processing states of the UsOW, including knowing whether the UsOW have been completely processed in the event of a failure. To fulfill this deficiency, tracker 126 saves a current state of the execution plan 110 in persistent data storage. In the event of a failure, such as a server crash during execution of UOW lists or steps 112*a-n*, execution of UsOW from the point of failure can be restarted using the state information persisted by the tracker 126. Upon recovery from the failure, tracker 126 asks the dispatcher 128 to start execution of those UsOW that have not been completely processed but whose prerequisites are complete. This way, inefficiencies caused by restarting the execution plan 110 from the point of failure are mitigated.

Figure 2A:
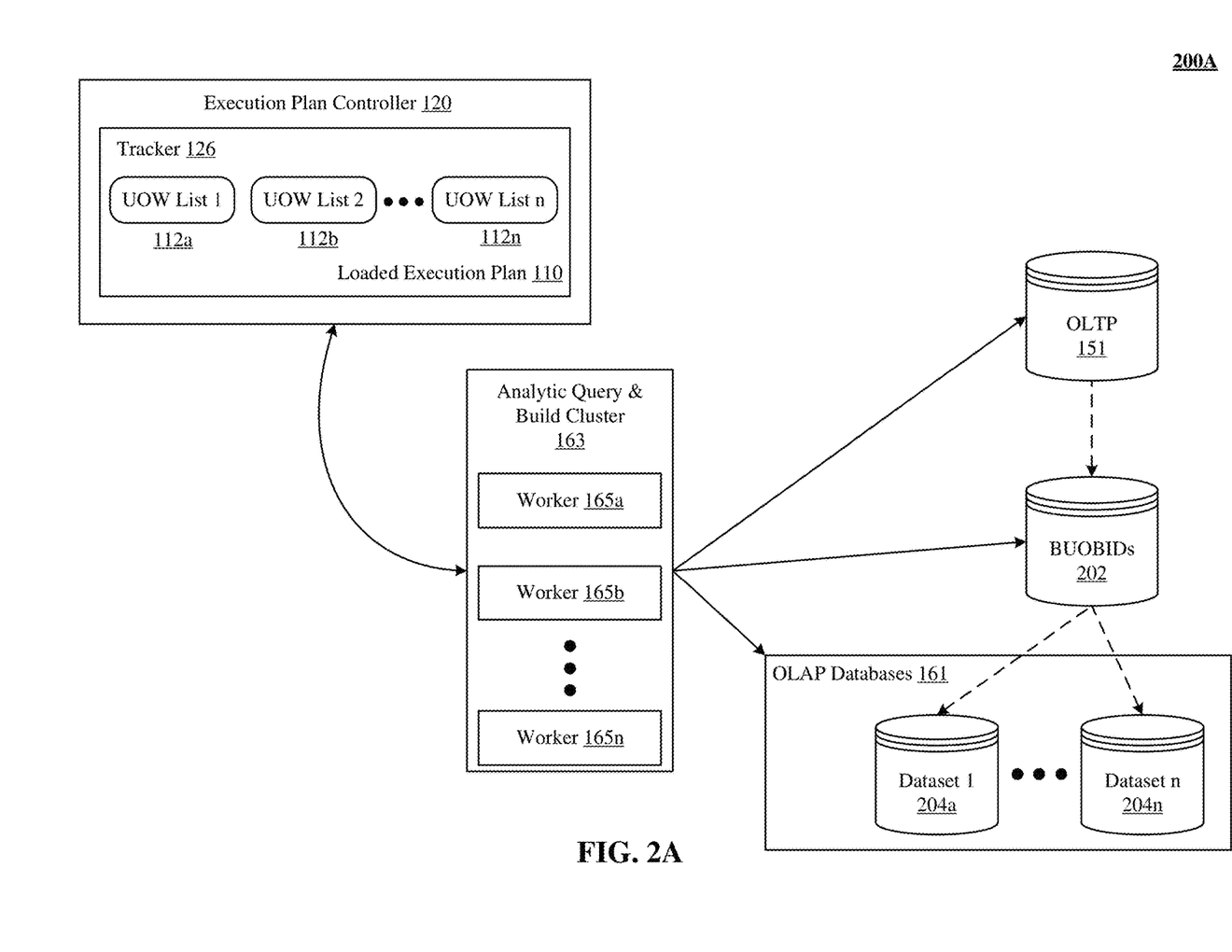
FIG. 2A depicts one implementation of an execution plan controller that dispatches UsOW to the AQBC of FIG. 1 in accordance with an execution plan.

FIG. 2A depicts one implementation of the execution plan controller 120 that dispatches UOW lists or steps 112*a-n* to AQBC 163 in accordance with the execution plan 110. In example 200A, tracker 126 is loaded with the execution plan 110. As UsOW in UOW lists 112*a-n* are processed by AQBC 163, the tracker 126 marks the UOW lists that are complete by associating with completely processed UOW lists storage for an indication of completion.

As shown in FIG. 2A, the UsOW are processed by the workers 165*a-n* in AQBC 163. Workers 165*a-n* apply UsOW build requests to the OLTP transaction updatable system 151 and execute the ELT process to build intermediate datasets called bulk updatable-only builder-input-datasets (BUOBIDs) 202. Once created, BUOBIDs 202 are responsive to OLAP build requests in dependence upon OLAP dataflow build specifications identified in respective UsOW. When OLAP build requests are executed on BUOBIDs 202, datasets 204*a-n* are efficiently built from the cached BUOBIDs 202 and stored in OLAP analytic databases 161.

Figure 2B:
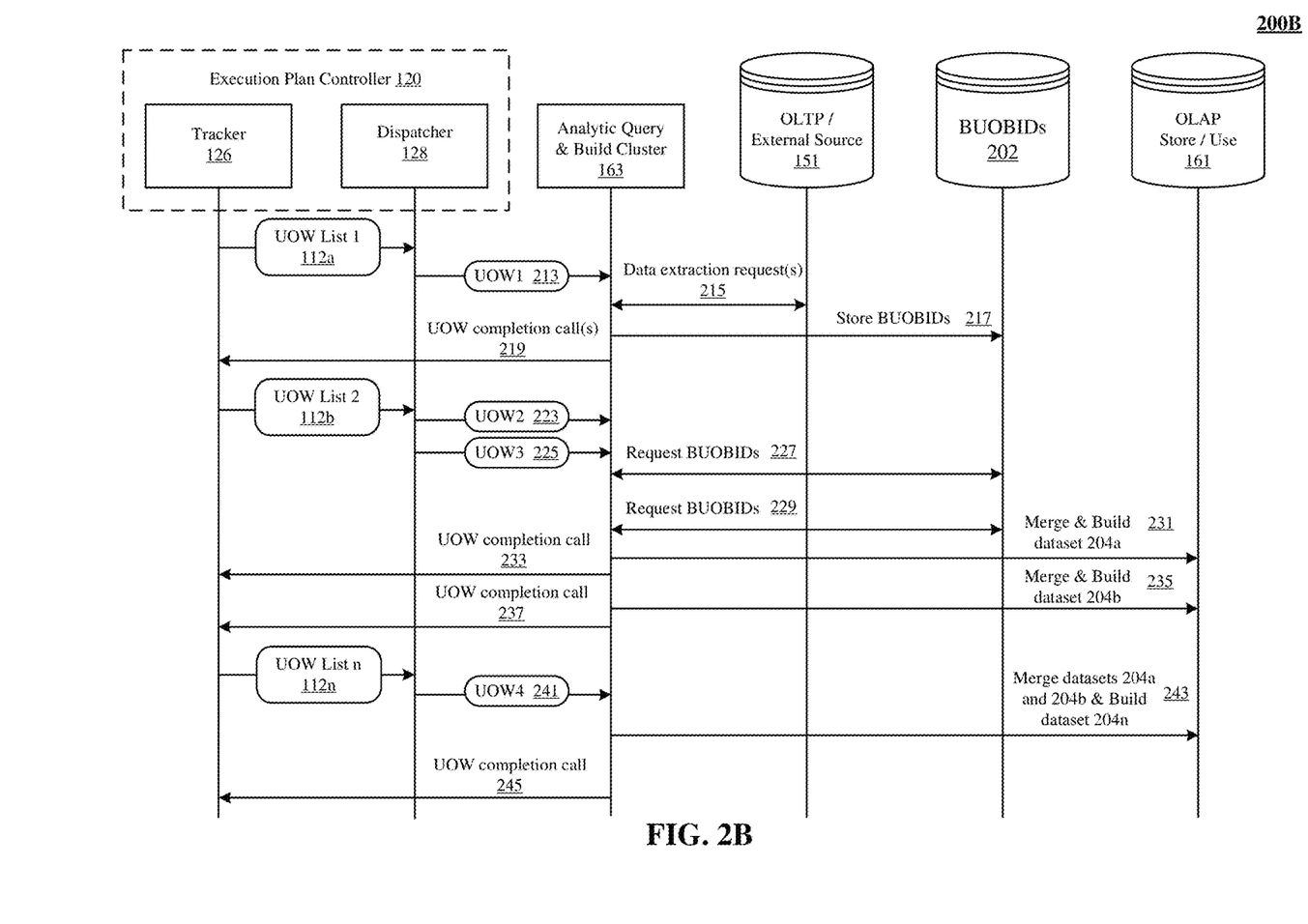
FIG. 2B is an example message sequence diagram illustrating pseudo-synchronous processing of UsOW by the AQBC.

FIG. 2B shows communication between the execution plan controller 120, the AQBC 163, the OLTP 151, BUOBIDs 202 and the OLAP databases 161 as a message sequence diagram 200B. Other implementations may perform the exchanges in different orders and/or with different, fewer, or additional exchanges than the ones illustrated in FIG. 2B. For convenience, the sequence diagram is described with reference to the system that carries out a method. The system is not necessarily part of the method.

Message Sequence Diagrams

In FIG. 2B, UOW lists in the execution plan 110 can include multiple UsOW, each of which can either be an ELT request to build a BUOBID from the OLTP transaction updatable system 151 or a merge and build request to create a dataset in OLAP databases 161. Diagram 200B shows three UOW lists or steps, namely, UOW list 1, UOW list 2, and UOW list n. The first UOW list 1 112*a* represents a so-called "replication flow", which incrementally replicates database objects and fields from the OLTP transaction updatable system 151 to the BUOBIDs 202. The second UOW list 2 112*b* creates OLAP analytic datasets from BUOBIDs 202. This involves determining the merge dependencies specified in OLAP dataflow build specifications identified in respective UsOW of the UOW list 2 112*b* and building OLAP analytic datasets for each of those UsOW. The last UOW list n 112*n* creates new OLAP analytic datasets from previously created OLAP analytic datasets. This also involves determining the merge dependencies specified in OLAP dataflow build specifications identified in respective UsOW of the UOW list n 112*n* and building OLAP analytic datasets for each of those UsOW.

To initiate processing of UsOW in the execution plan 110, tracker 126 sends the UOW list 1 112*a* to the dispatcher 128. In response, dispatcher 128 creates an individual build request for each of the UsOW listed in the UOW list 1 112*a*. In diagram 200B, UOW list 1 112*a* contains UOW1 213, which is a BUOBID build request. BUOBID build requests operate on separate database objects and fields in the OLTP transaction updatable system 151. The database objects and fields are specified in UOW1 213.

Dispatcher 128 then sends UOW1 213 to AQBC 163 for processing. In response, AQBC 163 processes data extraction request(s) 215 on the database objects and fields in the OLTP transaction updatable system 151. This results in the creation of BUOBIDs for the respective database objects and fields. After this, via message 217, AQBC 163 stores the processed database objects and fields as BUOBIDs 202, which can be further used to create different OLAP datasets 204*a-n* that are responsive to analytic queries. The OLAP datasets 204*a-n* are respectively built by merging the processed database objects and fields in dependence upon a dataflow specification identified by a corresponding UOW.

After BUOBIDs 202 are populated, AQBC 163 sends UOW completion calls(s) message(s) 219 to tracker 126. In response, tracker 126 checks the UOW list 1 112*a* to determine whether all the BUOBIDs requests in UOW1 213 are complete. The done done calls for each BUOBIDs request can arrive at the tracker 126 in random order. For example, consider that UOW1 213 is a build request for "opportunity" and "account" database objects in the OLTP 151. It may be the case that AQBC 163 creates a BUOBID for the account database object before creating a BUOBID for the opportunity database object, or vice-versa. However, until it has received done done calls for both the opportunity and account database objects, tracker 126 does not initiate dispatching of the next UOW list 2 112*b*.

UOW list 2 112*b* comprises two UsOW—UOW 2 223 and UOW 3 225. The two UsOW include merge and build instructions to create two different datasets 204*a* and 204*b* from BUOBIDs 202. Upon receiving the UOW list 2 112*b* from tracker 126, dispatcher 128 sends two UOW build requests to AQBC 163; one for UOW 2 223 and another for UOW 3 225. In response, AQBC 163 sends two BUOBIDs requests 227 and 229 to BUOBIDs 202. Following this, AQBC 163 performs merge and build operations 231 and 235 that result in the creation of datasets 204*a* and 204*b*. Finally, AQBC 163 sends UOW completion calls 233 and 237 to tracker 126; one for dataset 204*a* and another for dataset 204*b*.

The last UOW list 112*n* has just one UOW4 241. UOW4 241 includes merge and build instructions that apply directly to already created datasets 204*a* and 204*b*. Upon receiving the UOW list 112*n* from tracker 126, dispatcher 128 sends a UOW build request to AQBC 163 for UOW4 241. In response, AQBC 163 sends merge and build instructions 243 to create a new OLAP dataset 204*n* from datasets 204*a* and 204*b*. Finally, AQBC 163 sends UOW completion call 245 to tracker 126.

Since all the UOW lists in execution plan 110 are completely processed, tracker 126 marks the current execution plan 110 as complete.

Figure 3:
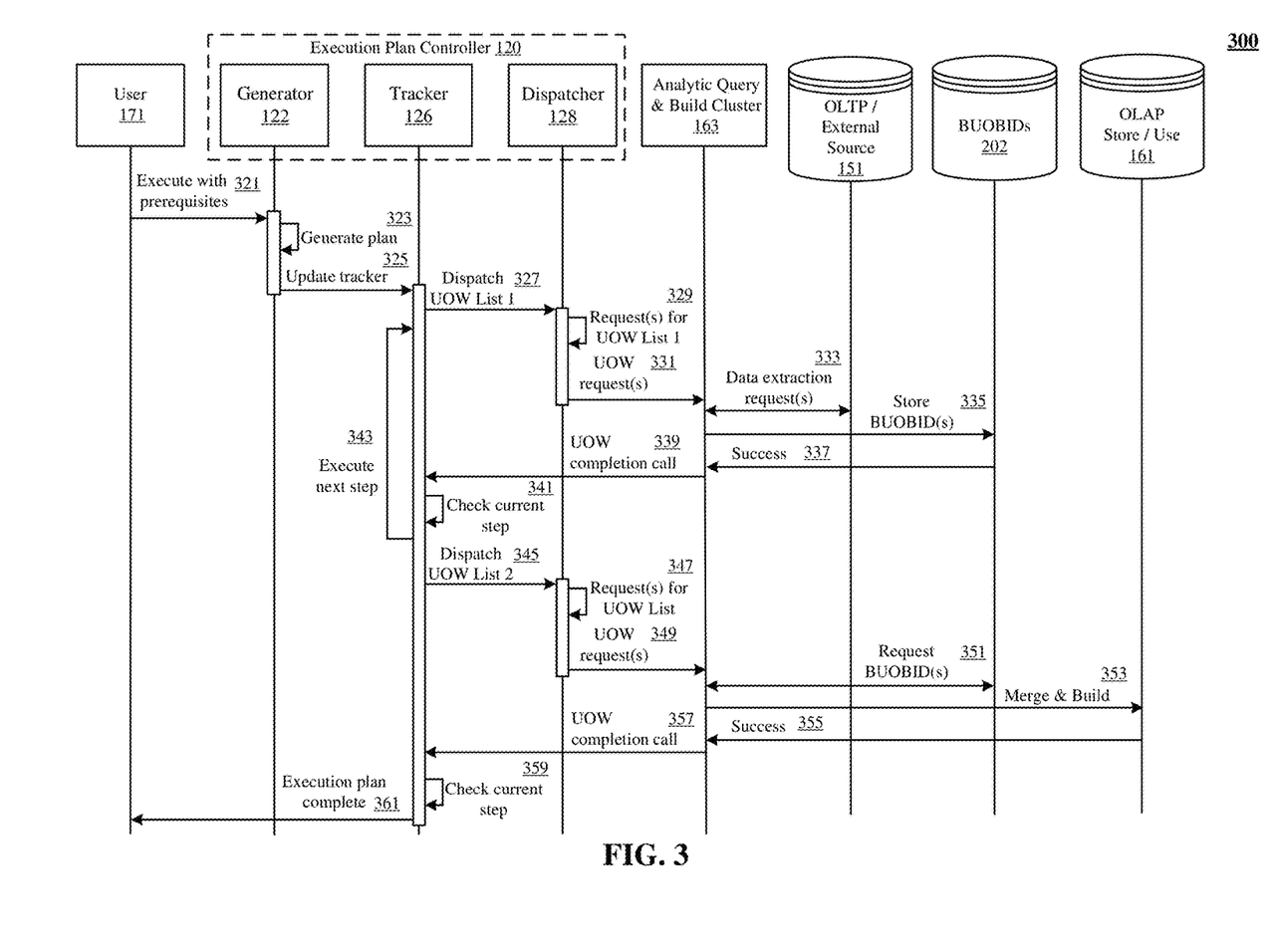
FIG. 3 is an example message sequence diagram illustrating generation of an execution plan and pseudo-synchronous processing of UsOW by the AQBC in accordance with the generated execution plan.

FIG. 3 is an example message sequence diagram 300 that builds on the UsOW ordering described in FIGS. 2A and 2B. Diagram 300 shows communication between the user 171, the execution plan controller 120, the AQBC 163, the OLTP 151, BUOBIDs 202, and the OLAP databases 161. Other implementations may perform the exchanges in different orders and/or with different, fewer, or additional exchanges than the ones illustrated in FIG. 3. For convenience, the sequence diagram is described with reference to the system that carries out a method. The system is not necessarily part of the method.

FIG. 3 shows two UOW lists, namely, UOW list 1 and UOW list 2. As described in reference to FIG. 2B, the first UOW list 1 includes UsOW that create BUOBIDs 202 and the second UOW list 2 includes UsOW that create OLAP analytic datasets from BUOBIDs 202. First, user 171 sends an execute with prerequisites message 321 to execution plan generator 122. In response, execution plan generator 122 creates the execution plan 110 using a generate plan message 323. Then, tracker 126 is loaded with a copy of the execution plan 110 via an update tracker message 325 from the generator 122. Tracker 126 then sends the first UOW list 1 to the dispatcher 128 via a dispatch UOW list 1 message 327. In response, dispatcher 128 creates requests for all UsOW listed in the first UOW list 1 via a request(s) for UOW list 1 message 329. Similarly, all UOW requests are dispatched to AQBC 163 via per UOW-messages such as UOW request(s) message 331.

AQBC 163 then dispatches the UsOW build requests to respective paths, for example, ELT UsOW requests are directed towards OLTP 151 and merge and build requests are applied to OLAP databases 161. In diagram 300, AQBC 163 sends data extraction request(s) 333 to the OLTP 151. AQBC 163 stores the created BUOBIDs 202 via store BUOBID(s) message 335. A success message 337 is sent to AQBC 163 from BUOBIDs 202 after each store BUOBID request 335 is completed. Following this, tracker 126 receives a UOW completion call message 339 from AQBC 163 after completion of the UOW request(s) 331. Tracker 126 then updates the status of completed UOW in UOW list 1. After each update, tracker 126 checks the status of all UsOW in the current UOW list via a check current step message 341. If one or more UsOW in the current UOW list are not complete, tracker 126 does not proceed to dispatch the next UOW list 2 to the dispatcher 128. When all UsOW in the current UOW list 1 are complete, tracker 126 initiates execution of UsOW in a next UOW list via execute next step message 343.

Also in diagram 300, the next UOW list 2 includes a UOW for merge and build operation. The tracker 126 dispatches the UOW list 2 to dispatcher 128 via a dispatch UOW list 2 message 345. In response, dispatcher 128 generates requests for all UsOW in UOW list 2 via a request(s) for UOW list message 347. These UOW requests are sent to AQBC 163 via UOW requests(s) message 349. Following this, AQBC 163 retrieves the required BUOBIDs via a request BUOBIDs message 351. AQBC 163 then performs merge and build process 353 to create OLAP datasets in the OLAP databases 161. Upon receiving a success message 355, AQBC 163 sends a UOW completion call message 357 to tracker 126. In response, tracker 126 updates the status of the UOW as completed and checks the status of all UsOW in the current UOW list 2 using a check current step message 359. When all of the UOW lists in the execution plan 110 are completely processed, tracker 126 sends out an execution plan complete message 361 to user 171.

Directed Acyclic Graph (DAG)

Figure 4:
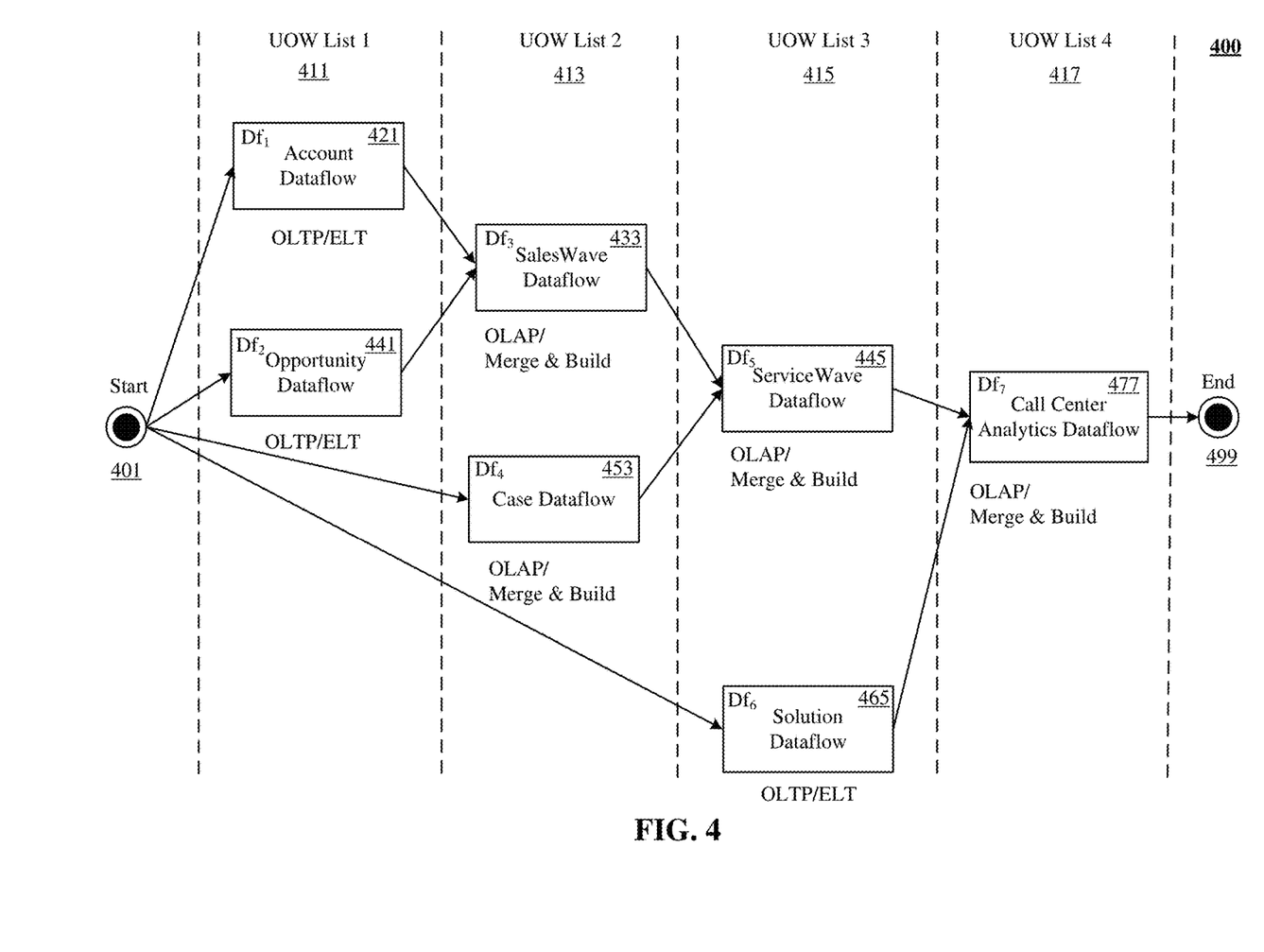
FIG. 4 is a directed acyclic graph (DAG) of UsOW that identifies prerequisites among the UsOW.

FIG. 4 is an example directed acyclic graph (DAG) 400 of UsOW that identifies prerequisites among UsOW. There are seven UsOW in the DAG 400—account dataflow 421 also referred to as Df1, opportunity dataflow 441 (Df2), sales wave dataflow 433 (Df3), case dataflow 453 (Df4), service wave dataflow 445 (Df5), solution dataflow 465 (Df6), and call center analytics dataflow 477 (Df7). It is noted that dataflows in DAG 400 are used as an example to explain ordering of UsOW in execution plan 110. The UsOW in DAG 400 are partitioned in four UOW lists or steps: UOW list 1 411, UOW list 2 413, UOW list 3 415, and UOW list 4 417, which are indicated by broken lines.

In DAG 400, UsOW are arranged UOW lists in accordance with their prerequisites, starting from a start point 401 and ending at an end point 499. The nodes of DAG 400 are connected to each other through directed edges. The direction of edges indicates ordering of the UsOW. For example, UOW 421 is connected to UOW 433 with a directed edge pointing towards UOW 433. This indicates that UOW 421 is a prerequisite to UOW 433. Additionally, UOW 441 is also a prerequisite to the UOW 433. Execution plan controller 120 ensures that UOW 433 is dispatched for processing after UsOW 421 and 441 are completely processed.

A path on the DAG 400 from the start point 401 to the end point 499 is also referred to herein as a "chain". Each UOW in a particular chain in DAG 400 can be in a different step identified by a respective UOW list. The chains can have indexes that indicate a count of the number of UsOW in a given UOW list. For example, one of the chains in DAG 400 has four UsOW: Df1 421, Df3 433, Df5, 445, and Df7 477, arranged in a sequence between the start point 401 and the end point 499. The length of this chain is four because it has four UsOW. In other implementations, the length can be more or less than four; however having a length greater than four is a more common use case.

There are two types of UsOW in example DAG 400. The first type of UOW is labelled as "OLTP/ELT". The second type of UOW is labelled as "OLAP/Merge & Build". The OLTP/ELT type UsOW are the entry point UsOW on the chains in DAG 400 because the OLAP/Merge & Build UsOW operate on BUOBIDs 202 created by OLTP/ELT type UsOW. OLTP/ELT type UsOW include instructions for extracting requested database objects and fields from OLTP 151 to create a BUOBID 202. The UOW prerequisite information shown in the DAG 400 can be specified by user 171 through a task group user interface (shown in FIG. 6). Such information can also be given to execution plan controller 120 through other mechanisms such as an API call.

Step List of UOW Lists

Figure 5:
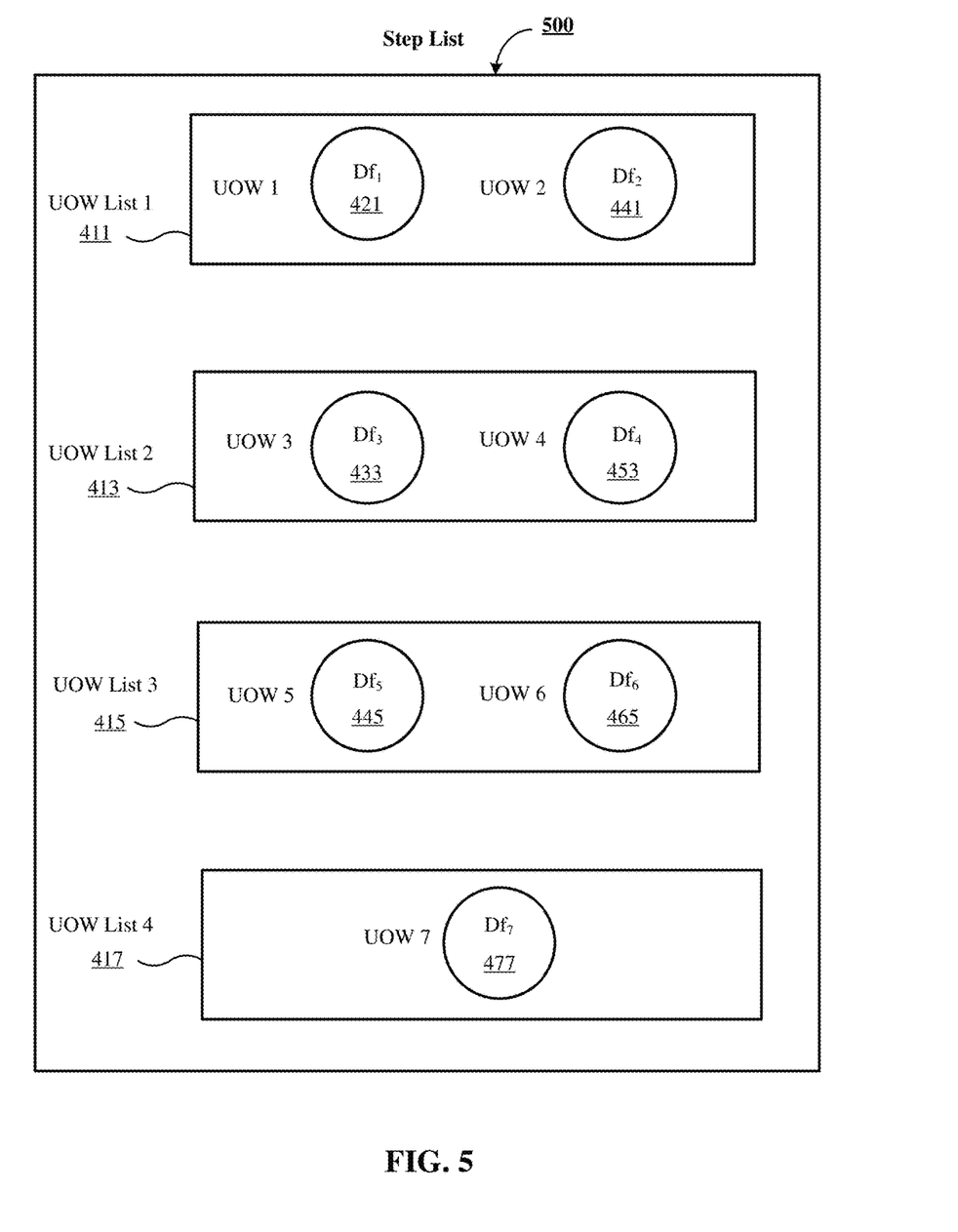
FIG. 5 is a step list of unit of work (UOW) lists created in dependence upon the DAG of FIG. 4.

FIG. 5 is a step list 500 of unit of work (UOW) lists created in dependence upon DAG 400. Generator 122 uses UOW prerequisites or dependencies in DAG 400 to create a step list 500 of UOW lists. A UOW list contains UsOW that do not have any dependency amongst each other, according to one implementation. In other implementations, they do have dependencies. In FIG. 5, UsOW $Df_1$ to $Df_7$ correspond to respective nodes of DAG 400 that have matching labels. Also in FIG. 5, UOW lists correspond to partitions of the DAG 400 that have matching labels.

Turning now to UOW list 1 411 of step list 500, which contains UOW 1 Df1 421 and UOW 2 Df2 441. Since these UsOW do not have any dependencies amongst them, dispatcher 128 can dispatch these UsOW in parallel to AQBC 163 for execution (subject to certain concurrency limits, as explained earlier). After AQBC 163 completes processing of these UsOW, it sends done done call messages to the tracker 126, which in turn checks the status of other UsOW in the current UOW list. If all the UsOW in the current UOW list are complete, tracker 126 informs the dispatcher 128 to start processing the UsOW in a next UOW list.

Turning now to UOW list 2 413 of step list 500, which contains UOW 3 Df3 433 and UOW 4 Df4 453. Dispatcher 128 dispatches these UsOW for execution after both the UsOW in the UOW list 1 411 have been completely processed by AQBC 163. The same steps can be followed by dispatcher 128 and tracker 126 for dispatching UsOW in UOW list 3 415 and UOW list 4 417.

Task Group Interface

Figure 6:
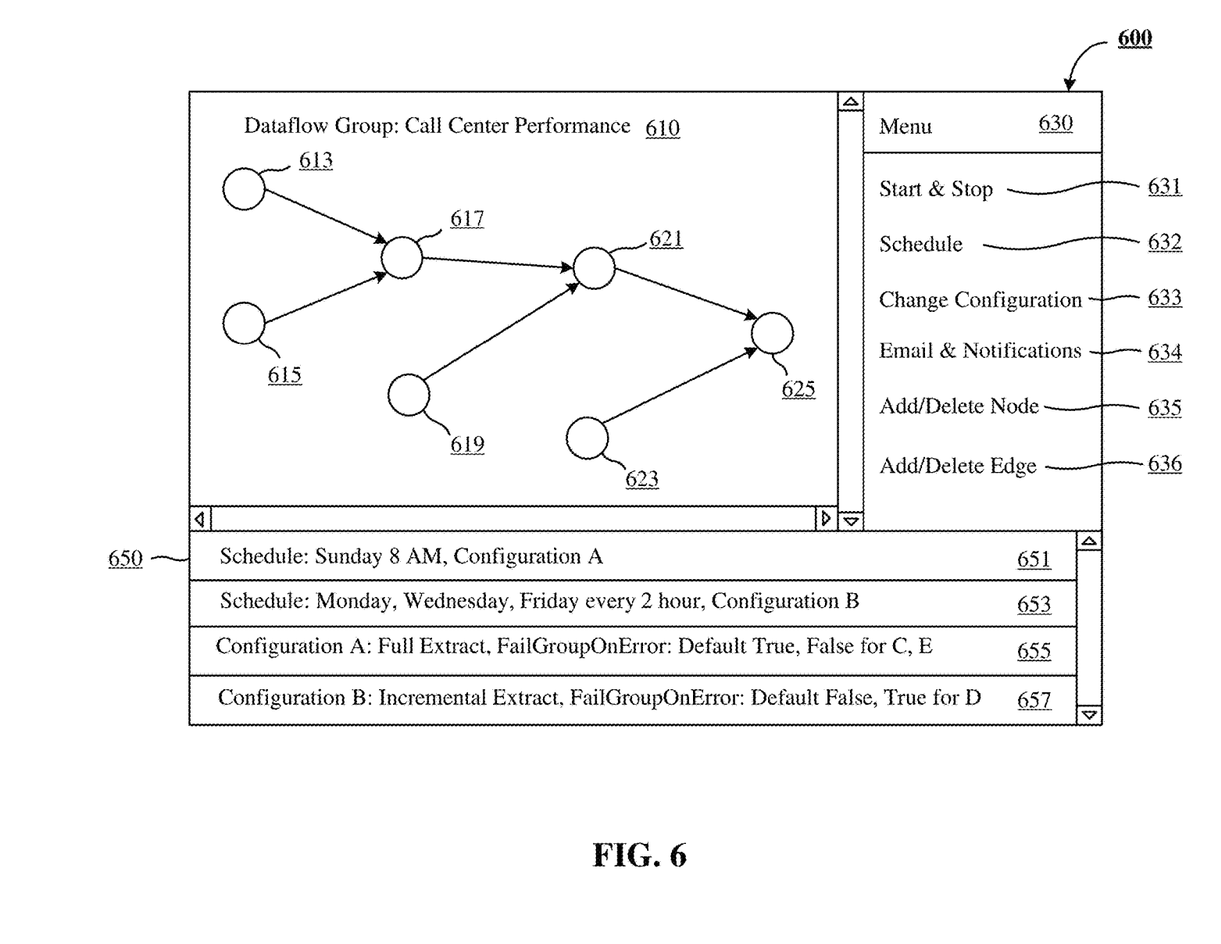
FIG. 6 is an example task group user interface that can be used to define prerequisites among UsOW.

FIG. 6 is an example task group user interface 600 that can be used to define a group of UsOW with prerequisites. There are three main parts of interface 600, namely a canvas 610, a menu 630, and a list 650. A title of the task group can be listed at the top of the canvas 610. The title can be defined by user 171. Using the menu 630, user 171 can select and insert UsOW on the canvas 610. User 171 can also connects UsOW with directed edges to indicate prerequisite UsOW. In example interface 600, user 171 has selected UOW 613 and UOW 615 as prerequisites to UOW 617. UOW 621 has UOW 617 and UOW 619 as its prerequisites. UOW 621 and UOW 623 are prerequisites to another UOW 625.

Menu 630 contains a list of menu items that can be used by user 171 to create task group 610. A start and stop menu item 631 can be used to manually start and stop execution of task group 610. A schedule menu item 632 can be used to schedule execution time and day for task group 610. A change configuration menu item 633 can be used to modify configuration settings in the list 650. An email and notification menu item 634 can be used to set up email and other notifications to be sent upon completion or failure of execution of UsOW in task group 610. The last two menu items include an add/delete node menu item 635 and an add/delete edge menu item 636. These two menu items can be used to create the nodes and edges in task group 610.

Bottom part of interface 600 contains a list 650 of execution schedules and configuration properties of task group 610. A first list item 651 is an example schedule entry indicating that task group 610 is scheduled to execute at 8 AM on every Sunday. Additionally, it shows that configuration A can be used in this scheduled execution. A second list item 653 shows that task group 610 is scheduled to execute every two hours on Mondays, Wednesdays, and Fridays using configuration B. A list item 655 shows the details of configuration A. It indicates that configuration A is a full extraction job of certain database objects and fields from OLTP 151. The second part of the configuration A 655 lists the behavior of task group 610 when an error occurs in execution of UsOW. A second configuration entry is presented in a list item 657 that shows incremental data updates from OLTP 151.

Computer System

Figure 7:
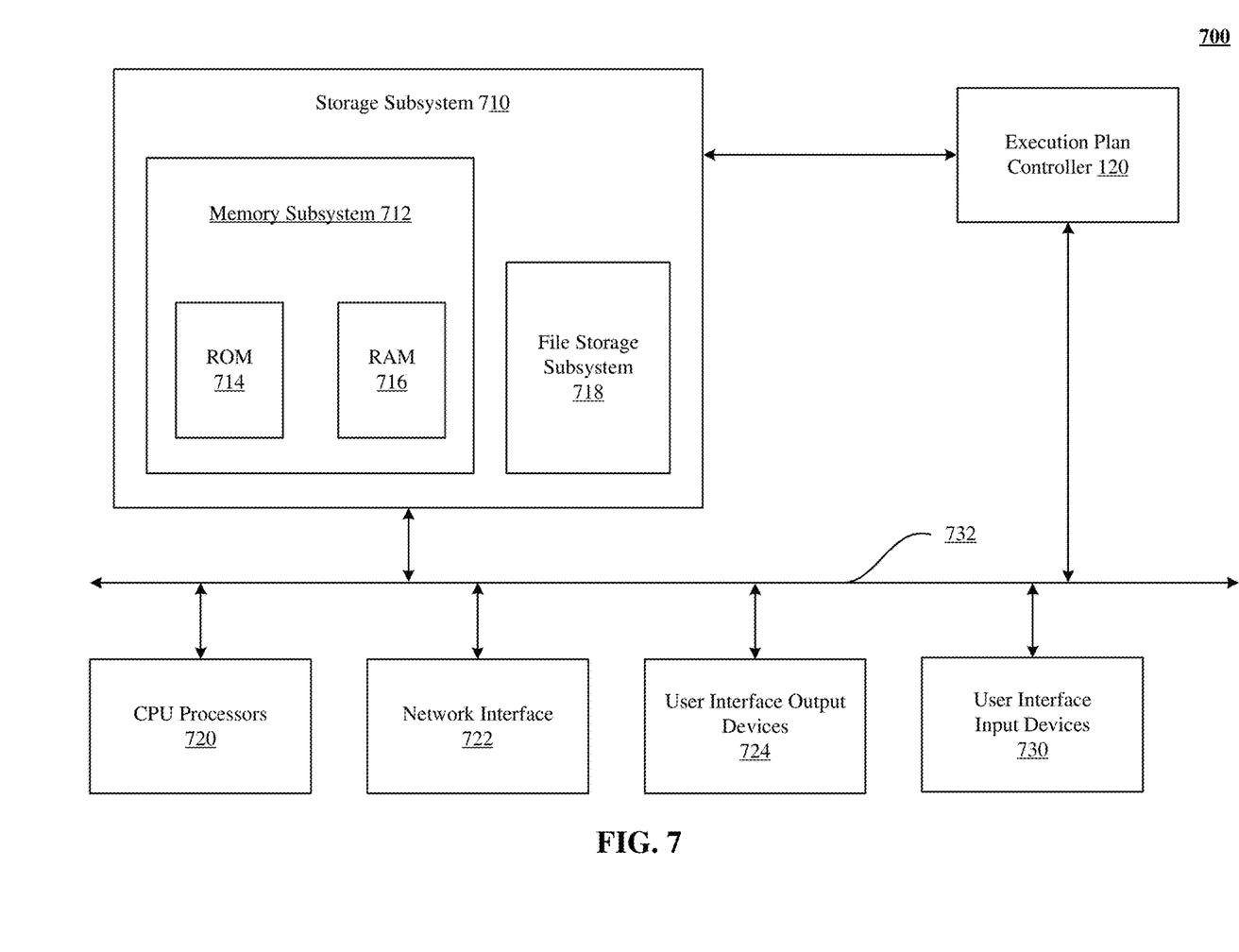
FIG. 7 is a simplified block diagram of a computer system that can be used to implement the execution plan controller of FIG. 1.

FIG. 7 is a simplified block diagram of a computer system that can be used to implement the execution plan controller 120 of FIG. 1. Computer system 700 typically includes one or more CPU processors 720 that communicate with a number of peripheral devices via bus subsystem 732. These peripheral devices can include a memory subsystem 712 including, for example, memory devices and a file storage subsystem 718, user interface input devices 730, user interface output devices 724, and a network interface subsystem 722. The input and output devices allow user interaction with computer system 700. Network interface subsystem 722 provides an interface to outside networks, including an interface to corresponding interface devices in other computer systems.

The execution plan controller 120 is connected to the storage subsystem 710 and the bus subsystem 732.

User interface input devices 730 or clients or client devices can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 700.

User interface output devices 724 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 700 to the user or to another machine or computer system.

Storage subsystem 710 stores programming and data constructs that provide the functionality of some or all of the modules and methods described herein. These software modules are generally executed by CPU processors 720.

Memory subsystem 712 in the storage subsystem can include a number of memories including a main random access memory (RAM) 716 for storage of instructions and data during program execution and a read only memory (ROM) 714 in which fixed instructions are stored. A file storage subsystem 718 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 718 or the memory subsystem 712, or in other machines accessible by the processor.

Bus subsystem 732 provides a mechanism for letting the various components and subsystems of computer system 700 communicate with each other as intended. Although bus subsystem 732 is shown schematically as a single bus, alternative implementations of the bus subsystem can use multiple busses. In some implementations, an application server (not shown) can be a framework that allows the applications of computer system 700 to run, such as the hardware and/or software, e.g., the operating system.

Computer system 700 itself can be of varying types including a personal computer, a portable computer, a workstation, a computer terminal, a network computer, a television, a mainframe, a server farm, a widely-distributed set of loosely networked computers, or any other data processing system or user device. Due to the ever changing nature of computers and networks, the description of computer system 700 depicted in FIG. 7 is intended only as a. specific example for purposes of illustrating the preferred embodiments of the present invention. Many other configurations of computer system 700 are possible having more or less components than the computer system depicted in FIG. 7.

Particular Implementations

We describe various implementations of pseudo-synchronous processing of units of work (UsOW) by an analytic query and build cluster (AQBC), also referred herein as "analytics cluster".

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

A system implementation of the technology disclosed includes one or more processors coupled to the memory. The memory is loaded with computer instructions to control deployment of units of work to an analytics cluster. The analytics cluster follows dataflow build specifications defined in the units of work to create multiple non-updatable online analytic processing (OLAP) databases. The hardware resources of the analytics cluster used in creating the OLAP databases are shared between building databases and responding to user queries.

An execution plan controller executes on a separate hardware from the analytics cluster and deploys units of work in a current step to the analytics cluster according to an execution plan. In response to the execution plan, the execution plan controller groups the units of work into steps for execution and submits the units of work for a particular step to the analytics cluster without prerequisites for order of processing among the units of work in the particular step.

Following this, the execution plan controller, in response to the execution plan, creates bulk updatable-only builder-input-datasets. Multiple non-updatable OLAP analytic databases are created by the execution plan controller in response to the execution plan.

The execution plan controller, monitors the completion of all units of work by the analytics cluster in the current step of a step list in the execution plan before deploying additional units of work at a next step in the step list to the analytics cluster.

This system implementation and other systems disclosed optionally include one or more of the following features. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

The AQBC shares limited hardware resources among multiple users and multiple non-updatable OLAP analytic databases. It guards user query response experience by controlling its own ordering of simultaneous units of work (UsOW) and resource allocation between responding to queries and executing the UsOW deployed by the execution plan controller.

The ordered UsOW can be arranged in a directed acyclic graph with multiple entry and exit points. A plurality of ordered UsOW have prerequisites among UsOW from entry points to at least one exit point in the directed acyclic graph.

The UsOW in the directed acyclic graph are arranged in chains from entry to exit points of the chains. The chains have indexes that count the number of UsOW from entry to exit points of the chains. Each unit of work in a particular chain is in a separate step from other UsOW in the particular chain.

In one implementation, a plurality of the chains have indexes greater than or equal to four. In another implementation, the system has a directed acyclic graph having chains with an index value of at least five.

The UsOW include extraction of object sets from an OLTP transaction updatable system to incrementally replicate database objects since a prior extraction. Such database objects and fields are stored and updated in multiple bulk updatable-only builder-input-datasets for respective object sets. The extractions of the object sets are entry points to the directed acyclic graph.

If bulk updatable-only builder-input-datasets for respective object sets have not been created in a prior extraction, the UsOW also include extraction of object sets from an OLTP transaction updatable system to fully replicate database objects and fields.

Further, the UsOW also include merging and organizing the multiple bulk updatable-only builder-input-datasets for the respective object sets from a replicated data cache to produce the multiple non-updatable OLAP analytic databases.

Further, the UsOW also include, merging and organizing the multiple bulk updatable-only builder-input-datasets for the respective object sets to produce the multiple intermediate non-updatable OLAP analytic databases. The multiple intermediate non-updatable OLAP analytic databases are merged and organized to produce at least one non-updatable OLAP analytic database.

The UsOW with OLAP dataflow build specifications for replication dataflows are deployed to the AQBC before the UsOW with OLAP dataflow build specifications for user dataflows are deployed to the AQBC.

The ordering of the ordered UsOW is defined based on user input through a user interface. In one implementation, the user input is received at an application programming interface (API) end point.

The execution plan controller also creates a snapshot of the execution plan before deploying the ordered UsOW to the AQBC. In such an implementation, the execution plan controller maintains the deployment ordering in accordance with the snapshotted execution plan. This occurs in response to detecting a change to the snapshotted execution plan after initiating deployment of the ordered UsOW to the AQBC in accordance with the snapshotted execution plan.

The execution plan is generated based on a properties file that identifies scheduling and execution attributes of the OLAP dataflow build specifications.

The execution plan identifies prerequisites data processing operations to be completed before initiating the deployment of the OLAP dataflow build specifications to the AQBC. In such an implementation, the prerequisite data processing includes generating a CSV file from an external data source to be identified as input source in at least one of the OLAP dataflow build specifications deployed to the AQBC.

The system further includes an execution plan tracker that tracks states of the OLAP dataflow build specifications identified in the execution plan. The execution plan tracker uses a request ID to identify undispatched dataflow build specifications that have not yet been deployed to the analytics cluster. It also uses an instance ID to identify dispatched dataflow build. specifications that have been deployed to the analytics cluster but not yet completely processed by the analytics cluster. It further uses a complete ID to identify dataflow build specifications that have been completely processed by the analytics cluster.

The execution plan tracker implements a failure recovery scheme which, in response to detecting a failed execution of a first OLAP dataflow build specification, responds by reprocessing the first OLAP dataflow build specification.

Other implementations may include a non-transitory computer readable storage medium storing instructions executable by a processor to perform functions of the system described above. Yet another implementation may include a method performing the functions of the system described above.

Another system implementation of the technology disclosed includes one or more processors coupled to the memory. The memory is loaded with computer instructions to control deployment of ordered UsOW to an AQBC. The AQBC applies online analytic processing (OLAP) dataflow build specifications defined in the UsOW to create multiple non-updatable OLAP analytic databases. The hardware resources of the AQBC are shared for processing of the OLAP dataflow build specifications and user queries.

An execution plan controller deploys the ordered UsOW in a current step to the AQBC according to an execution plan. The execution plan groups the UsOW into unit of work (UOW) lists in a step list such that the UsOW in a UOW list have no prerequisites amongst themselves.

Following this, the execution plan provides OLAP dataflow build specifications for the ordered UsOW. Multiple non-updatable OLAP analytic databases are created collectively by OLAP dataflow build specifications, beginning with bulk updatable-only builder-input-datasets.

The execution plan controller monitors the completion of all UsOW in the current step of the step list by the AQBC. After the completion of all UsOW in the current step, it progresses to deployment of additional OLAP dataflow build specifications to the AQBC from a next UOW list in a next step in the step list.

Each of the features discussed in this particular implementation section for the first system implementation apply equally to this system implementation. As indicated above, all the system features are not repeated here and should he considered repeated by reference.

Other implementations may include a non-transitory computer readable storage medium storing instructions executable by a processor to perform functions of the system described above. Yet another implementation may include a method performing the functions of the system described above.

A method implementation of the technology disclosed includes controlling deployment of units of work to an analytics cluster and following dataflow build specifications defined in the units of work to create multiple non-updatable OLAP databases using hardware resources of the analytics cluster. The hardware resources of the analytical cluster are shared between building databases and responding to user queries.

The method includes using an execution plan controller executing on hardware separate from the analytics cluster. The execution plan controller deploys units of work in a current step to the analytics cluster according to an execution plan. The execution plan controller groups the units of work into steps for execution in response to the execution plan. Following this, the execution plan controller submits the units of work for a particular step to the analytics cluster without prerequisites for order of processing among the units of work in the particular step.

Further in response to the execution plan, the execution plan controller creates bulk updatable-only builder-input-datasets. Following this, the execution plan controller creates multiple non-updatable OLAP analytic databases from the bulk updatable-only builder-input-datasets.

The method includes using the execution plan controller to monitor completion of all units of work by the analytics cluster in the current step of a step list in the execution plan before deploying additional units of work to the analytics cluster at a next step in the step list.

Another method implementation of the technology disclosed includes controlling deployment of ordered UsOW to an AQBC. The AQBC applies OLAP dataflow build specifications defined in the UsOW to create multiple non-updatable OLAP analytic databases. The hardware resources of AQBC are shared for processing of the OLAP dataflow build specifications and user queries.

The method includes using an execution plan controller to deploy the ordered UsOW in a current step to the AQBC according to an execution plan. The execution plan groups the UsOW into UOW lists in a step list such that the UsOW in a UOW list have no prerequisites amongst themselves.

Following this, the execution plan provides OLAP dataflow build specifications for the ordered UsOW. Multiple non-updatable OLAP analytic databases are created collectively by OLAP dataflow build specifications beginning with bulk updatable-only builder-input-datasets.

The method further includes using the execution plan controller to monitor the completion of all UsOW in the current step of the step list by the AQBC. After the completion of all UsOW in the current step, it progresses to deployment of additional OLAP dataflow build specifications to the AQBC from a next UOW list in a next step in the step list.

Each of the features discussed in this particular implementation section for the first system implementation apply equally to this method implementation. As indicated above, all the system features are not repeated here and should be considered repeated by reference.

A computer readable media (CRM) implementation includes a non-transitory computer readable storage medium storing instructions executable by a processor to perform a method as described above. Another CRM implementation may include a system including memory and one or more processors operable to execute instructions, stored in the memory, to perform a method as described above.

In another CRM implementation, the technology disclosed includes a non-transitory computer readable storage medium impressed with computer program instructions to control deployment of ordered UsOW to an AQBC. The AQBC applies online analytic processing (OLAP) dataflow build specifications defined in the UsOW to create multiple non-updatable OLAP analytic databases. The instructions, when executed on a processor, implement the method described above.

Each of the features discussed in this particular implementation section for the first system implementation apply equally to this CRM implementation. As indicated above, all the system features are not repeated here and should be considered repeated by reference.

Any data structures and code described or referenced above are stored according to many implementations on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A method of controlling deployment of units of work to an analytic query and build cluster (referred to as analytics cluster), following dataflow build specifications defined in the units of work, creating multiple non-updatable online analytic processing (abbreviated OLAP) databases, using hardware resources of the analytics cluster that are shared between building databases and responding to user queries, the method including:
   generating, using an execution plan controller executing on hardware separate from the analytics cluster, an execution plan based at least in part on dependencies defined between one or more units of work of a set of units of work;
   grouping, using the execution plan controller, the units of work of the set of units of work into steps of a step list based at least in part on the generated execution plan;
   deploying a current step of the step list to the analytics cluster according to the execution plan, wherein each unit of work in the current step of the step list is not dependent on another unit of work in the current step of the step list, and wherein at least one unit of work in a next step of the step list is dependent on a unit of work in the current step based at least in part on the defined dependencies between the one or more units of work of the set of units of work;
   creating, using the analytics cluster, bulk updatable-only builder-input-datasets and creating, from the bulk updatable-only builder-input-datasets, multiple non-updatable OLAP analytic databases; and
   monitoring, using the execution plan controller, completion by the analytics cluster of all units of work in the current step of the step list in the execution plan before deploying to the analytics cluster additional units of work in the next step in the step list.

2. The method of claim 1, wherein the analytics cluster shares limited hardware resources among multiple users and multiple non-updatable OLAP analytic databases, and guards user query response experience by controlling its own ordering of simultaneous units of work and resource allocation between responding to queries and executing the units of work deployed by the execution plan controller.

3. The method of claim 1, wherein at least a plurality of the units of work have prerequisites among units of work from entry points to at least one exit point in a directed acyclic graph.

4. The method of claim 3, wherein the prerequisites among the units of work are arranged in chains from entry to exit points of the chains, the chains have indexes that count the number of units of work from entry to exit points of the chains, and each unit of work in a particular chain is in a separate step of the step list from other units of work in the particular chain.

5. The method of claim 4, wherein a plurality of the chains have indexes greater than or equal to four.

6. The method of claim 4, wherein a plurality of the chains have indexes greater than or equal to five.

7. The method of claim 3, wherein units of work include:
   extraction of object sets from an OLTP transaction updatable system to incrementally replicate database objects and fields updated since a prior extraction, from the OLTP transaction updatable system, to multiple bulk updatable-only builder-input-datasets for respective object sets and wherein extractions of the object sets are entry points to the directed acyclic graph.

8. The method of claim 7, wherein units of work also include:
   extraction of object sets from an OLTP transaction updatable system to fully replicate database objects and fields if bulk updatable-only builder-input-datasets for respective object sets have not been created in a prior extraction.

9. The method of claim 7, wherein units of work also include:
   merging and organizing the multiple bulk updatable-only builder-input-datasets for the respective object sets from a replicated data cache to produce the multiple non-updatable OLAP analytic databases.

10. The method of claim 7, wherein units of work also include:
   merging and organizing the multiple bulk updatable-only builder-input-datasets for the respective object sets to produce the multiple intermediate non-updatable OLAP analytic databases; and merging and organizing the multiple intermediate non-updatable OLAP analytic databases to produce at least one non-updatable OLAP analytic database.

11. The method of claim 3, wherein the units of work with OLAP dataflow build specifications for replication dataflows are deployed to the analytics cluster before the units of work with OLAP dataflow build specifications for user dataflows are deployed to the analytics cluster.

12. The method of claim 3, wherein the ordering of the ordered units of work is defined based on user input through a user interface.

13. The method of claim 3, wherein the ordering of the ordered units of work is defined based on user input received at an application programming interface (API) end point.

14. The method of claim 1, wherein the execution plan controller creates a snapshot of the execution plan before deploying the ordered units of work to the analytics cluster.

15. The method of claim 14, wherein the execution plan controller, in response to detecting a change to the snapshotted execution plan after initiating deployment of the ordered units of work to the analytics cluster in accordance with the snapshotted execution plan:
maintains the deployment ordering in accordance with the snapshotted execution plan.

16. The method of claim 1, wherein the execution plan is generated based on properties that identifies scheduling and execution attributes of the OLAP dataflow build specifications.

17. The method of claim 1, wherein the execution plan identifies prerequisites data processing operations to be completed before initiating the deployment of the OLAP dataflow build specifications to the analytics cluster.

18. The method of claim 17, wherein the prerequisite data processing includes generating a CSV file from an external data source to be identified as input source in at least one of the OLAP dataflow build specifications deployed to the analytics cluster.

19. The method of claim 1, further including an execution plan tracker that tracks states of the OLAP dataflow build specifications identified in the execution plan by:
using a request ID to identify undispatched dataflow build specifications that have not yet been deployed to the analytics cluster;
using an instance ID to identify dispatched dataflow build specifications that have been deployed to the analytics cluster but not yet completely processed by the analytics cluster; and
using a complete ID to identify dataflow build specifications that have been completely processed by the analytics cluster.

20. The method of claim 19, wherein the execution plan tracker implements a failure recovery scheme which, in response to detecting a failed execution of a first OLAP dataflow build specification, responds by reprocessing the first OLAP dataflow build specification.

21. A system including one or more processors coupled to memory, the memory loaded with computer instructions to control deployment of units of work to an analytic query and build cluster (referred to as analytics cluster), following dataflow build specifications defined in the units of work, creating multiple non-updatable online analytic processing (abbreviated OLAP) databases, using hardware resources of the analytics cluster that are shared between building databases and responding to user queries, the instructions, when executed on the processors, implement actions comprising:
generating, using an execution plan controller executing on hardware separate from the analytics cluster, an execution plan based at least in part on dependencies defined between one or more units of work of a set of units of work;
grouping, using the execution plan controller, the units of work of the set of units of work into steps of a step list based at least in part on the generated execution plan;
deploying a current step of the step list to the analytics cluster according to the execution plan, wherein each unit of work in the current step of the step list is not dependent on another unit of work in the current step of the step list, and wherein at least one unit of work in a next step of the step list is dependent on a unit of work in the current step based at least in part on the defined dependencies between the one or more units of work of the set of units of work;
creating, using the analytics cluster, bulk updatable-only builder-input-datasets and creating, from the bulk updatable-only builder-input-datasets, multiple non-updatable OLAP analytic databases; and
monitoring, using the execution plan controller, completion by the analytics cluster of all units of work in the current step of the step list in the execution plan before deploying to the analytics cluster additional units of work in the next step in the step list.

22. A non-transitory computer readable storage medium impressed with computer program instructions to control deployment of units of work to an analytic query and build cluster (referred to as analytics cluster), following dataflow build specifications defined in the units of work, creating multiple non-updatable online analytic processing (abbreviated OLAP) databases, using hardware resources of the analytics cluster that are shared between building databases and responding to user queries, the instructions, when executed on a processor, implement a method comprising:
generating, using an execution plan controller executing on hardware separate from the analytics cluster, an execution plan based at least in part on dependencies defined between one or more units of work of a set of units of work;
grouping, using the execution plan controller, the units of work of the set of units of work into steps of a step list based at least in part on the generated execution plan;
deploying a current step of the step list to the analytics cluster according to the execution plan, wherein each unit of work in the current step of the step list is not dependent on another unit of work in the current step of the step list, and wherein at least one unit of work in a next step of the step list is dependent on a unit of work in the current step based at least in part on the defined dependencies between the one or more units of work of the set of units of work;
creating, using the analytics cluster, bulk updatable-only builder-input-datasets and creating, from the bulk updatable-only builder-input-datasets, multiple non-updatable OLAP analytic databases; and
monitoring, using the execution plan controller, completion by the analytics cluster of all units of work in the current step of the step list in the execution plan before deploying to the analytics cluster additional units of work in the next step in the step list.

* * * * *